Jan. 7, 1964   G. J. GOEPFERT ETAL   3,116,986
METHOD OF MAKING COLD-MOLDED ABRASIVE WHEEL
Filed March 25, 1960
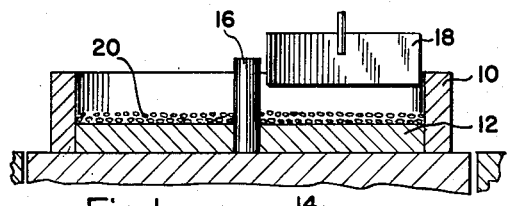
Fig.1
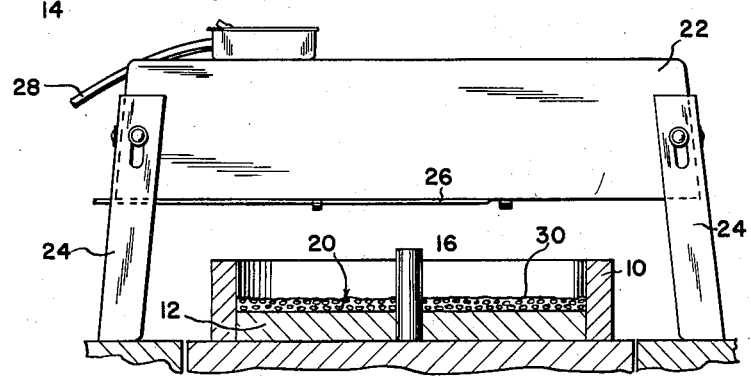
Fig.2
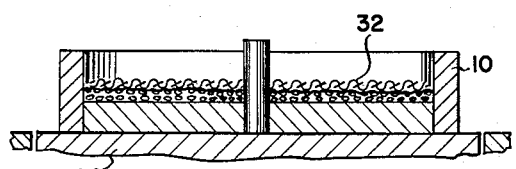
Fig.3
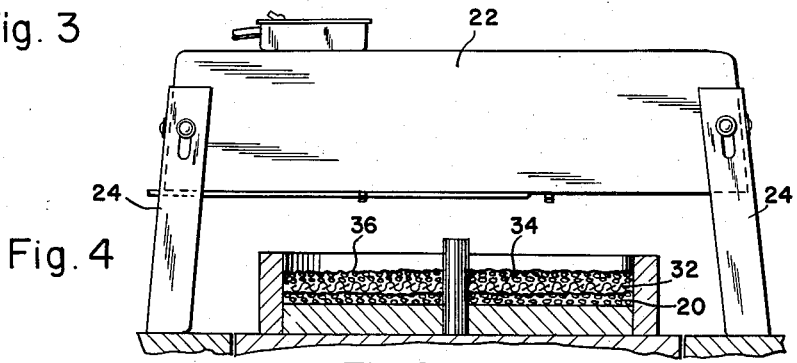
Fig.4
Fig.6
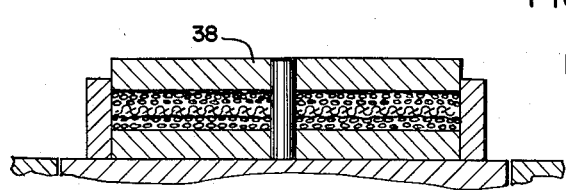
Fig.5
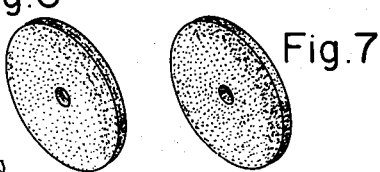
Fig.7
INVENTORS
George J. Goepfert
Edward C. Johns
BY
Curtis, Morris & Safford
ATTORNEYS

United States Patent Office 3,116,986
Patented Jan. 7, 1964

3,116,986
METHOD OF MAKING COLD-MOLDED
ABRASIVE WHEEL
George J. Goepfert, Cincinnati, and Edward C. Johns, Milford, Ohio, assignors to The Cincinnati Milling Machine Co., Cincinnati, Ohio
Filed Mar. 25, 1960, Ser. No. 17,576
11 Claims. (Cl. 51—297)

This invention relates to the manufacture of resin-bonded abrasive wheels and more particularly to the manufacture of so-called "cut off" and "depressed center" wheels which are relatively thin in relation to their diameters and hence are commonly made with some sort of reinforcement.

It is known in the art that resin-bonded abrasive wheels may be made from resin-coated abrasive grains by either a hot-molding process wherein the resin coated grains are molded under high pressure in a heated mold, or by a cold-molding process wherein a pressure-sensitive mix is used and molding is effected at relatively high pressure but at room temperature. It is further known that the cold-molding process provides certain economic advantages over the hot-molding process. More particularly, the cost of hot-molding equipment is considerably greater than the cost of cold-molding equipment of comparable capacity. Also the time required to mold a wheel cold is considerably less than the time required for hot-molding, and hence the productivity of the molding equipment is greatly increased when a cold-molding process is used. Moreover the cold-molding process produces wheels which, for certain applications, are superior to those produced by the hot-molding process.

On the other hand, the cold-molding process gives rise to certain problems that are not ordinarily encountered in hot-molding, particularly in those cases where it is desired to produce relatively thin, reinforced wheels. Such wheels are commonly made by assembling in a mold alternate layers of pressure-sensitive, resin-coated abrasive grains and fibrous reinforcing layers of, for example, glass or nylon cloth. The resulting laminates are molded at room temperature and at a pressure of say 1500 to 2000 p.s.i. The wheels are then removed from the mold and cured in an oven at an elevated temperature. Since there is some tendency for the cold-molded wheels to delaminate during the curing process, curing is normally effected with the wheels under a relatively light pressure, say 2.5 to 25 p.s.i. The pressure employed during curing must be maintained relatively low however, since otherwise the wheels will be deformed during the curing step.

It has been found that even when this known process is carried out under optimum conditions, the adhesion between the resin abrasive layers and the reinforcing material is non-uniform and often undesirably low. Also since a pressure-sensitive mix must be used in the cold-molding process, even a light pressure against the faces of the wheel during the curing step produces a certain amount of surface deformation of these surfaces.

It is accordingly an object of the present invention to provide an improved process for making cold-molded, resin-bonded abrasive grinding and cutting wheels. It is another object of the invention to provide a cold-molding process for making thin laminated reinforced abrasive wheels having improved adhesion between the laminae thereof. It is still another object of the invention to produce such grinding wheels having at least one face free from the surface deformation characteristic of wheels produced by certain prior cold-molding processes. Other objects of the invention will be in part obvious and in part pointed out hereafter.

In general, the objects and advantages of the present invention are achieved by rapidly heating only the upper surface layer of the resin-coated abrasive laminae during the mold charging operation and before the mold is completely assembled. This surface heating can be conveniently effected by using a source of radiant heat positioned above the mold, and directly exposing the upper surface of the resin-coated abrasive layer to the radiant heat for a short period of time, e.g., fifteen seconds to a few minutes.

The objects and advantages of the present invention can best be understood and appreciated by reference to the accompanying drawing which illustrates schematically various steps of the present process.

In the drawing:
FIGURE 1 is a vertical section through a suitable mold showing a first layer of resin-coated abrasive arranged in the mold;
FIGURE 2 is similar to FIGURE 1 but additionally illustrates a radiant heater position above the mold for heating the upper surface of the first layer of resin-coated abrasive;
FIGURE 3 shows a layer of reinforcing fabric positioned on the first layer of resin-coated abrasive;
FIGURE 4 shows the mold with a second layer of resin-coated abrasive assembled therein and the radiant heater in position for heating the upper surface of the second layer;
FIGURE 5 shows the mold assembly ready for application of molding pressure;
FIGURE 6 shows a cold-molded, reinforced wheel made by the present method; and,
FIGURE 7 shows a cold-molded, non-reinforced wheel made by the present method.

In order to point out more fully the nature of the present invention, a preferred embodiment of the method will now be described with reference being made to the accompanying drawing which illustrates certain of the steps of the method. As has been previously indicated, the wheel is formed from pressure-sensitive, resin-coated abrasive grains and a suitable fibrous reinforcement. The precise composition of the resin-coated abrasive forms no part of the present invention and any of various pressure-sensitive, coated abrasive mixes that are known to be useful in making cold-molded abrasive wheels can be employed. A typical mix that has been found satisfactory in the present process can be made as follows: 84 parts by weight of 24 grit aluminum oxide abrasive grain is put in a mixer, the mixer is started, and 3.15 parts of liquid phenolic resin (Bakelite 7534) is slowly added thereto and allowed to mix for about a minute. There are then successively added with continued mixing 7.1 parts of a polyvinylbutyral thermoplastic modified phenolic resin (Monsanto Resinox 795), 3 parts of cryolite filler and 2.5 parts of unmodified chrome-filled phenolic resin (Bakelite BR 8015). If desired, a small amount, say 0.25 part, of a suitable dye may be added. The resulting mix should be desirably used within about 4 hours after its preparation.

In like manner any of various known and previously proposed reinforcing materials may be used. The preferred reinforcement is glass cloth, with nylon cloth being also a particularly useful type of reinforcement in the present method. In the case of glass cloth, a resin-sized cloth is preferred, although cloth having other types of size thereon can be used.

Referring now to the drawing and more particularly to FIGURE 1, the mold there shown comprises a ring 10 and associated base 12 supported on the platen 14 of a suitable pressure molding apparatus. At the center of base 12 there is a cylindrical post 16 around which the wheel material is molded to provide a central hole in the wheel by means of which it can be mounted for use. A distributor plate 18 is supported above the mold in the usual manner for securing even distribution of the abrasive grain within the mold.

In carrying out the present method, a thin layer of pressure-sensitive, resin-coated abrasive grain is put in the mold and distributed evenly over the base 12 thereof by means of the distributor 18. Referring to FIGURE 2, a radiant heater 22 is then positioned over the mold as indicated. The heater 22 is supported on legs 24 which are adjustable to vary the height of heater above the mold and is provided with a heating surface 26 that directly confronts the upper surface 30 of the resin-coated abrasive layer 20. Electrical energy is supplied to the heater through a conduit 28 from any suitable source.

It is evident that the heating time required to effect the desired softening of the upper surface 30 of layer 20 will vary as a function of such factors as the nature of the resin-coated abrasive used, the height of the heating surface 26 above surface 30, and the temperature of the heating surface. It has been found that when using a resin-coated abrasive of the type indicated above with a heating surface 26 at 600° F. located about 3 inches above the coated abrasive layer 20, the optimum heating time is about 30 seconds. The optimum heating time for other heating conditions can be readily determined by experiment. The softened surface of layer 20 is designated by the reference character 30.

After the layer 20 has been heated to soften its upper surface 30, the heater 22 is removed and a disc 32 (see FIG. 3) of resin-sized glass cloth is placed thereon. As shown in FIG. 3, the glass cloth 32 preferably has a diameter slightly less than the internal diameter of ring 10 so as to provide direct contact between the coated abrasive layers at the periphery of the wheel. The glass cloth 32 is covered with a second coated abrasive layer 34 and heater 22 is again positioned over the mold as shown in FIG. 4 to heat the upper surface 36 of layer 34.

It should be noted that the purpose of the second radiant heating step is somewhat different from that of the first heating step. More particularly the purpose of the first heating step is to soften the surface of the coated abrasive to achieve better bonding between it and the glass cloth reinforcement. On the other hand, the purpose of the second heating step is to render the upper surface of the wheel more resistant to deformation during the subsequent curing operation. Hence the second heating step (illustrated in FIG. 4) is continued for a sufficient period of time to effect reduced resin bond mobility of the upper surface 36 of layer 34, i.e., to partially set the resin of surface 36. For the conditions set forth above the desired degree of reduction of resin bond mobility can be achieved in about a minute and a half. Under such circumstances the heated surface 36 of layer 34 reaches a maximum temperature of about 250° F.

While this last heating step has been described as a part of the method of making a thin reinforced wheel, it is equally applicable for use in the manufacture of non-reinforced wheels, particularly those in which grinding is to be effected against a wheel face which has been exposed to this type of heat treatment.

Upon completion of the heating of surface 36, the heater 22 is removed and a top plate 38 placed thereon. The laminate is then subjected to a molding pressure of about 1250 p.s.i. at atmospheric temperature to form a wheel such as that illustrated in FIG. 6.

As indicated above, curing of the wheels is desirably effected while they are under a light pressure to prevent delamination. The wheels are stacked face-to-back and put under a pressure of about 0.5 p.s.i. The assembled wheels are then placed in an oven and cured under conventional curing conditions e.g., up to and including 325° F. for 16 hours.

It has been found that reinforced grinding wheels made as described above are durable and free-cutting, and that they exhibit substantially less tendency toward delamination than prior cold-molded reinforced wheels. Moreover, the radiant heat treatment of the wheel face preserves the uniformly irregular contour of this surface during the subsequent curing operation wherein the wheels are under pressure, and hence provides an improved grinding face on the wheel. In part the present method provides a way in which the advantages of hot-molding e.g., improved adhesion between the layers of the laminate, can be achieved without the disadvantages of hot-molding e.g., relatively low productivity of relatively expensive hot-molding equipment.

It is of course to be understood that the foregoing description is to be interpreted as illustrative only and that numerous changes can be made in the materials employed and the operating conditions specifically mentioned above without departing from the spirit of the invention as set forth in the appended claims. Thus other known pressure-sensitive, coated abrasive mixes can be substituted for the mix specifically described herein. It has been found that the first heating step described above can be carried out either before or after the reinforcing disc 32 has been placed on the layer 20. The laminate that is cold-molded may comprise more than two layers of coated abrasive and more than a single reinforcing layer. Also suitable backing layers may be put on one or both sides of the wheel as is well known in the art.

As has been indicated the heating times for the radiant heating steps of the process will vary with the nature of the coated abrasive used and the spacing and temperature of the heater. Typically the heating time for the first heating step is about 15 to 45 seconds and for the second heating step 60 and 120 seconds.

Other modifications within the scope of the invention will be apparent to those skilled in the art.

We claim:

1. In a method of making cold-molded, resin-bonded, abrasive wheels of the type wherein layers of pressure-sensitive, phenolic resin-coated abrasive grains are assembled in a mold, the resulting laminate is molded under high pressure at room temperature to form a wheel and the molded wheel is cured at an elevated temperature, the improvement which comprises exposing at least one of said layers of resin-coated abrasive grains during assembly of said laminate to a source of radiant heat to heat only the upper surface thereof.

2. In a method of making cold-molded, resin-bonded, abrasive wheels of the type wherein alternate layers of pressure-sensitive, phenolic resin-coated abrasive grains and fibrous reinforcement are assembled in a mold, the resulting laminate is molded under high pressure at atmospheric temperature to form a wheel and the molded wheel is cured at an elevated temperature, the improvement which comprises exposing at least one of said layers of resin-coated abrasive grains during assembly of said laminate to a source of radiant heat to heat only the upper surface thereof.

3. In a method of making cold-molded, resin-bonded, abrasive wheels of the type wherein a first and second layer of pressure-sensitive, phenolic resin-coated abrasive grains are assembled in a mold with a fibrous reinforcing layer selected from the group consisting of glass and nylon cloth therebetween, the resulting laminate is molded under high pressure at atmospheric temperature to form a wheel and the molded wheel is cured at an elevated temperature, the improvement which comprises exposing at least one of said layers of resin-coated abrasive grains during assembly of said laminate to a source of radiant heat to heat only the upper surface thereof.

4. An improvement according to claim 3 and wherein the upper surface of said first layer of phenolic resin-coated abrasive grain is softened by radiant heating before application of said reinforcing material thereto.

5. An improvement according to claim 3 and wherein the upper surface of said first layer of phenolic resin-coated abrasive grain is softened by radiant heating after application of said reinforcing material thereto.

6. An improvement according to claim 3 and wherein the upper surface of said second layer is heated to reduce the resin bond mobility of said upper surface before molding pressure is applied to said laminate.

7. A method of making a cold-molded, resin-bonded abrasive wheel comprising the steps of forming a first layer of pressure-sensitive, phenolic resin-coated, abrasive grains in a mold, exposing the upper surface of said first layer of resin-coated abrasive grains to a source of radiant heat to soften said upper surface, applying a layer of glass cloth to the upper surface of said first layer of grains in said mold, forming a second layer of pressure-sensitive, phenolic resin-coated, abrasive grains on said glass cloth, molding the resulting laminate under high pressure at room temperature to form a wheel and removing the molded wheel from the mold and curing it at an elevated temperature.

8. A method according to claim 7 and wherein said second layer of phenolic resin-coated, abrasive grains is exposed to a source of radiant heat to reduce the resin bond mobility of its upper surface before said laminate is molded to form a wheel.

9. In a method of making cold-molded, resin bonded, abrasive wheels wherein pressure-sensitive phenolic resin-coated abrasive grains are charged into a mold, the resulting charged mix is molded under high pressure at room temperature to form a wheel, and the molded wheel is cured at an elevated temperature, the improvement which comprises exposing the upper surface of the resin-coated abrasive grains while in the mold and before completion of the mold assembly to a source of radiant heat to reduce resin bond mobility of said upper surface.

10. An abrasive wheel made in accordance with the method of claim 9.

11. An abrasive wheel made in accordance with the method of claim 2.

References Cited in the file of this patent

UNITED STATES PATENTS

| | | |
|---|---|---|
| 2,393,267 | Robie et al. | Jan. 22, 1946 |
| 2,642,370 | Parsons et al. | June 16, 1953 |
| 2,643,945 | Buckner | June 30, 1953 |
| 2,656,654 | Erickson | Oct. 27, 1953 |
| 2,734,813 | Zalud | Feb. 14, 1956 |
| 2,768,483 | Hurst | Oct. 30, 1956 |
| 2,808,688 | MacMaster | Oct. 8, 1957 |
| 2,899,288 | Barclay | Aug. 11, 1959 |
| 2,996,368 | Hermance | Aug. 15, 1961 |